Patented July 21, 1931

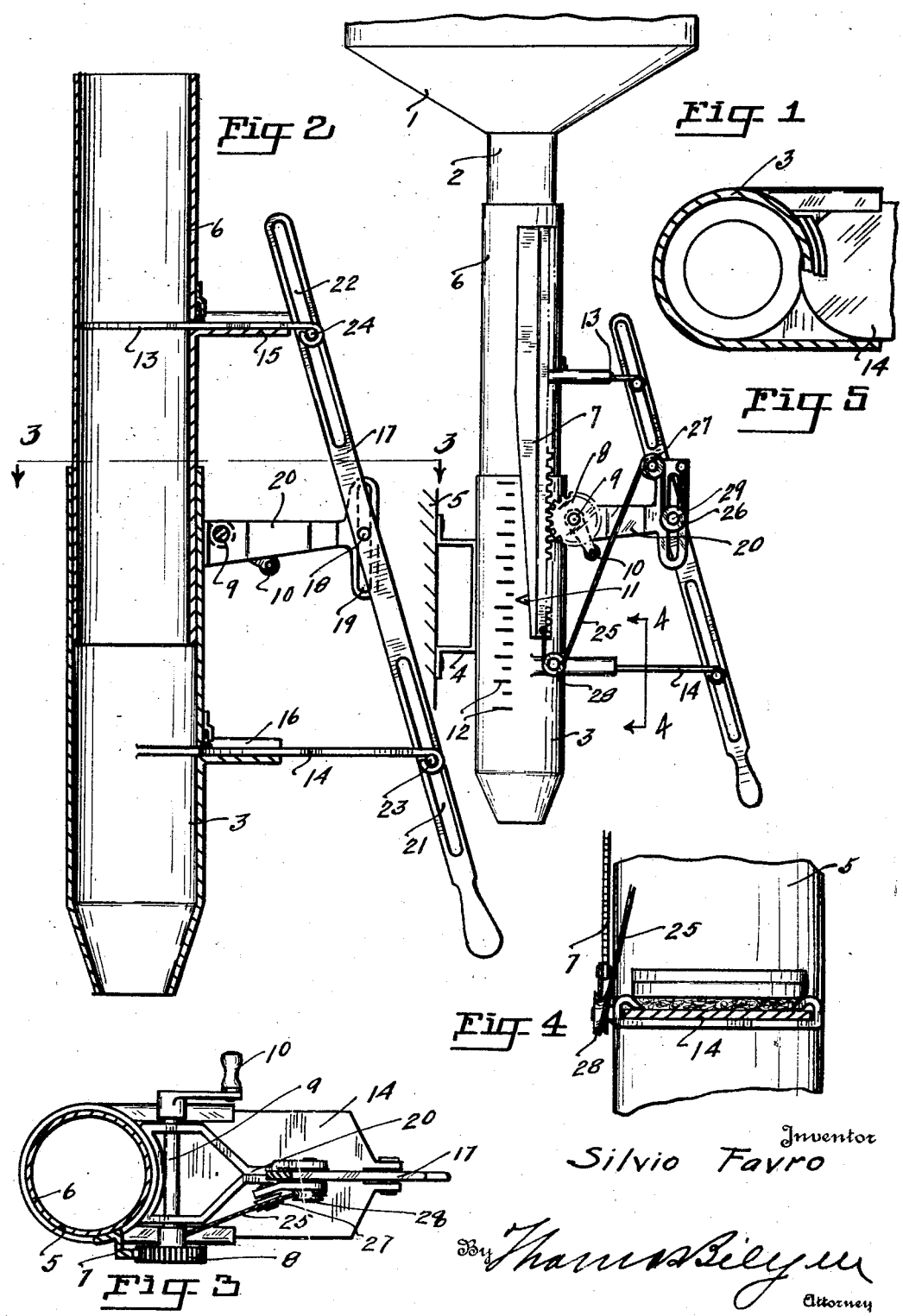

1,815,468

UNITED STATES PATENT OFFICE

SILVIO FAVRO, OF PORTLAND, OREGON

MEASURING DEVICE

Application filed October 24, 1929. Serial No. 402,122.

My invention relates to an automatic measuring device for use in the measuring of semi-liquids or comminuted solids that are passed through chutes, measuring heads and the like and has for its object the measuring of a specified amount of the materials and the depositing of the same therefrom into containers as bags, cans and the like.

The device is composed of a measuring head, composed of two independent cylindrical elements that are telescopically movable, one relative to the other. A cut off is provided, through each of the head elements, and is adapted to being manipulated by a common actuator. Settable means are provided for the adjusting of the spaced relationship of the two cut off members so that the volume of the measured elements being passed through the head may be settably predetermined. Graduations are provided upon one of the cylinders and a pointer is provided upon the other so that the volume of the elements being measured and that are disposed between the cut off elements is known by the inspection of the position of the pointer relative to that of the graduations.

The primary object of my device is for the speedy measuring of materials as macaroni, coffee, rice, wheat, flour, cement and any and all materials that are to be measured in mass production.

A further object of my invention consists in providing settable means for predetermining the relative position of the cut off elements and for indicating the same upon the exterior of the head.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side elevation of the assembled device shown in position upon the discharge chute of the hopper from which articles to be measured are drawn.

Fig. 2 is a longitudinal, sectional view of the mechanism illustrated in Fig. 1, the same being shown in side elevation.

Fig. 3 is a cross section view, taken on line 3—3 of Fig. 2 looking in the direction indicated.

Fig. 4 is a fragmentary, sectional, side view, taken on line 4—4 of Fig. 1, looking in the direction indicated.

Fig. 5 is a cross section view of the head made to illustrate the position of the cut off and illustrating the cut off in full retracted position.

Like reference characters refer to like parts throughout the several views.

1 is the hopper in which articles to be measured are stored and 2 is the discharge chute leading from the hopper 1. A graduated stationary head element 3 is fixedly positioned and is supported by a bracket 4, the bracket 4 being secured to any fixed surface 5. A movable head element 6 is disposed about the discharge chute 2 and is telescopically positioned relative to the head element 3. A gear rack 7 is secured to the head element 6 and a pinion 8 coacts with the rack 7. The pinion 8 is fixedly secured to the shaft 9 which is journaled within bracket 20. The bracket 20 is fixedly secured to the head element 3. The shaft 9 is actuated by a hand operated lever 10. A pointer 11 is carried by the rack segment 7 and is in registerable alignment with the graduations 12 disposed upon the head element 3. The movement of the head element 6 relative to the head element 3 predetermines the spaced relationship of the cut offs 13 and 14, slidably disposed within head elements 6 and 3 respectively. Guideways 15 and 16 are provided for each of the cut offs. A common actuating lever 17 is pivotally mounted upon a pin 18. The pin 18 is disposed within a slotted guideway 19 that is disposed in the outer end of the bracket 20. Slots 21 and 22 are disposed within the oppositely disposed ends of the lever 17 and are twice as long as slot 19; and pins 23 and 24 that are disposed within the outer ends of the respective cut offs are slidably disposed within the slots 21 and 22. In order for the device to function properly the vertical movement of the head 6 accomplished by actuating the handle 10 must be compensated in the lever assembly since the head 3 is fixedly secured and since the lever 17 is the common actuator for the cut-offs 13 and 14. This is accomplished by having a supporting flexible element 25 secured upon its one end to the lower end of the rack 7 and upon its oppositely disposed end to the outer upper end of the bracket 20 as illustrated in Fig. 1. A pulley 26 is secured to the free end 29 of pin 18; another pulley 27 is secured to the inner upper end of the bracket 20; and still another pulley 28 is secured to the guideway 16 and placed in direct alignment with the end of the rack. The flexible element is trained about the pulleys 26, 27 and 28 so that the vertical movement of the lever is just one-half that of the vertical movement of the head element 6 and the movement is in the same direction. When the head 6 is moved upwardly the lever 17 is also moved upwardly by the supporting element which is attached to the end of the rack and the slots 21 and 22 permit the free horizontal movement of the cut-offs 13 and 14. It will be seen that by the movement of the hand actuator 17, one of the cut offs is opened and the other is closed and the movement of the actuator in the opposite direction opens the other of the cut offs and closes the one disposed in spaced relationship with the same. The space within the cylinders and disposed between the two cut offs determines the volume of the elements to be measured.

The device having been described in detail, its operation is as follows: The head element 6 is reciprocated by the movement of the pinion on the rack. When the handle is turned in one direction the head moves upwardly and the distance between the cut-offs is increased with a proportionate increase in the volume within the heads as by the pointer and graduations. When the handle is turned in the opposite direction the opposite results are obtained. The lever 17 also moves vertically within the slot 19 and in the same direction that the head 6 moves. This is more clearly seen when it is assumed that the handle is being turned to move the head upwardly. As the head moves upwardly the flexible element 25 is pulled upwardly by the rack to which it is attached and since the flexible element is turned about the under side of pulleys 26 and 28 and about the upper portion of pulley 27 and since the other end of the flexible element is secured to the bracket 20, the lever 20 will move upwardly too and permit freedom of horizontal movement to the cut-offs because as the lever moves the pins 23 and 24 slide within the slots 21 and 22.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A device of the class described comprising a pair of cylindrical heads telescopically disposed one within the other, one of said heads maintained in fixed relation to the other of the heads that is reciprocably disposed within the fixed head, an opening disposed in each of said heads, pairs of guideways disposed in spaced relationship on each side of said openings, a bracket fixedly disposed near the upper end of the fixed head, said bracket having a slot vertically disposed at its free end, a shaft journaled within the bracket, a pinion disposed at one end of the shaft and a handle disposed at the other end of the shaft, a rack vertically disposed in spaced relations upon the reciprocating head and in direct alignment with the pinion, an actuating lever pivotally and slidably disposed within the slot disposed within the bracket, said lever having a slot disposed at each one of its ends, a pair of cut-offs slidably disposed within the openings, said cut-offs having their free ends slidably disposed within the actuating lever in working relationship when the moving head is reciprocated.

2. A device of the class described comprising a pair of heads telescopically disposed one within the other, one of said heads maintained in fixed position relative to the other, an opening disposed in each of said heads, guideways disposed in spaced relationship on each side of said openings, a bracket secured to and outwardly extending from the fixedly positioned head, said bracket having a slot vertically disposed within its free end, an actuating lever having a slot disposed at each end pivotally and slidably disposed within the slot disposed within the bracket, cut-offs slidably disposed within the openings, the free end of said cut-offs being slidably maintained within the slots disposed upon the ends of the actuating lever, pulleys secured to the fixedly disposed head, to the bracket, and to the actuating lever respectively, a flexible element disposed about said pulleys having its free ends secured to the lower end of the gear rack and to the end of the bracket, and manually operable means including a pinion disposed within the bracket for vertically reciprocating the reciprocably disposed head and lever in timed relationship.

SILVIO FAVRO.